May 20, 1952     H. L. REILLY ET AL     2,597,531
SPEED AND/OR DISTANCE DETERMINING INSTRUMENT
Filed Feb. 26, 1948     2 SHEETS—SHEET 1

INVENTORS
HUGH L. REILLY,
FRANK H. SCRIMSHAW & ARTHUR G. BONE
BY
Young, Emery & Thompson
ATTORNEYS.

Patented May 20, 1952

2,597,531

UNITED STATES PATENT OFFICE 2,597,531

SPEED AND/OR DISTANCE DETERMINING INSTRUMENT

Hugh Lambert Reilly, Frank Herbert Scrimshaw, and Arthur George Bone, Farnborough, England, assignors, by mesne assignments to Kelvin & Hughes Limited, Glasgow, Scotland, a British company Application February 26, 1948, Serial No. 11,025
In Great Britain November 29, 1946

Section 1, Public Law 690, August 8, 1946
Patent expires November 29, 1966

8 Claims. (Cl. 73—183)

This invention relates to instruments, intended primarily for use on aircraft as air mileage indicators or air logs, for determining, i. e., indicating or recording, speed and/or distance travelled relative to the air, and of the kind in which pitot impact pressure (referred to hereinafter simply as "pitot pressure") and pressure from the outlet of a motor driven fluid pressure generator of centrifugal type (referred to hereinafter simply as "fan pressure" and "fan" respectively) are applied in opposition to pressure responsive means for controlling the speed of the fan motor, whereby the latter is caused to vary or "hunt" about a mean speed dependent upon speed of travel relative to the air for actuating tachometer and/or counter means of convenient type.

There is described in British patent specification No. 565,214 an instrument of this kind in which the pressure responsive means afford a greater mechanical advantage for the applied fan pressure than for the applied pitot pressure, the fan intake being connected with a source of static pressure, and the pressure responsive means comprising a diaphragm of which at one side thereof a large area is presented to applied fan pressure and of which at the other side thereof a small area is presented to applied pitot pressure and also an intermediate area to the same static pressure as that with the source of which the fan intake is connected.

The accuracy of the instrument decreases progressively with increase of air speed, however, because owing to the different mechanical advantages offered to applied pitot and fan pressures, respectively, the disturbance (virtual increase), due to compressibility of the air, of the applied pitot pressure is greater than the disturbance (virtual increase) of the applied fan pressure and it is found that for speeds exceeding a limit of the order of 300 knots, the fan must run at a speed substantially in excess of that corresponding to the speed of travel relative to the air.

In British patent specification No. 579,216 there is described a modified instrument in which the effective radius of the fan employed increases progressively with increase in the rotary speed thereof, and so reduces the fan speed required for balance of the pressure responsive means to a value corresponding to the speed of travel. This modified instrument considerably increases the speed range for a given degree of accuracy, but owing to practical design considerations the extended range has a limit of the order of 400 knots.

The present invention has for an object to provide an instrument of the kind referred to having a further extended speed range.

In an instrument of the kind referred to, for determining speed and/or distance travelled relative to the air, according to the invention, the pressure responsive means afford a smaller mechanical advantage for the fan presure than for the pitot pressure, the fan intake is connected with a source of pitot pressure so that the fan pressure is pitot pressure plus the pressure produced by the fan, and the fan is such that its effective radius decreases with increase of its rotary speed.

Owing to increased density due to the connection of the fan intake to a source of pitot, instead of static pressure in this case, fan pressure will increase more than linearly with the square of fan speed and consequently the fan would run at too low a speed were it not for the automatic decrease in the effective radius of the fan which increases the speed of the latter for balance of the pressure responsive means to a value corresponding to the speed of travel relative to the air.

Preferably, the pressure responsive means include a diaphragm of which at one side thereof a large area is presented to pitot pressure and of which at the other side thereof two smaller areas are presented to fan pressure and static pressure, respectively.

As in the earlier instruments referred to it is important that the temperature in the fan casing should be maintained substantially the same as that of the outside air and, according to a feature of the invention, the fan is designed for mounting, e. g. in the wing of an aircraft, and preferably as a unit separate from the pressure responsive means employed, with a substantial part of the outer surface of its casing or of a member secured to said casing in intimate contact with the latter in direct contact with the outside air.

Any known or convenient type of fan of which the effective radius decreases with increase of rotary speed may be employed in an instrument according to the invention but preferably the fan used is one in which according to a feature of the invention there is provided at the end of one or more rigidly mounted blades a beam member one end of which is shaped to serve as a continuation or extension of the corresponding rigid blade, said beam member being mounted to rock against spring influence from an extended (maximum radius) position in which its fan end is at its maximum distance from the fan centre and its other end is at its minimum distance from the fan centre to a retracted (minimum radius) position in which the fan end is at its minimum distance and the other end of the beam member is at its maximum distance from said centre, the beam member being of lighter weight towards the fan end than towards the other end thereof so that centrifugal force acting thereon progressively overcomes the spring influence and retracts the fan end of the beam member as the speed of rotation of the fan is increased.

In general, the arrangement will be such that when the beam member, or each of them is fully retracted the fan end thereof is at least as far from the fan centre as the other end thereof.

Preferably, the beam member, or each of them, is mounted to rock in a general plane to which the axis of rotation of the fan is normal.

Preferably, the beam member, or each of them, is carried and spring influenced by a curved leaf spring attached to the end of the corresponding rigidly mounted fan blade and joining the beam member intermediately of the length of the latter.

Preferably also, the beam member, or each of them, is formed as by pressing from sheet metal, integrally with such a spring mounting therefor, and as a channel section member from which part of the base is displaced (from between the flanges) to extend from a point intermediately of the length of said member in a general direction transversely of the latter as a spring mounting tongue for attachment to a rigidly mounted fan blade and to constitute together with the remainder of the base an extension of the fan blade, the channel section member being weighted at the end from which the mounting tongue is displaced. Such weighting may be effected simply by rolling or folding the projecting ends of the flanges upon themselves, but preferably a weight is mounted between the ends of the flanges, if desired so that its position lengthwise of the beam member may be adjusted.

In such a construction the blade tip part of the channel section member (i. e. that end part of the base remote from the tongue) is preferably displaced in the direction opposite to that in which the tongue is displaced. Preferably also the tongue extends between and beyond the flanges and the latter are cut away so as to decrease progressively in depth towards, and to terminate at, the displaced blade tip part of the base.

The invention is illustrated by the accompanying diagrammatic drawings of which—

Figure 1:
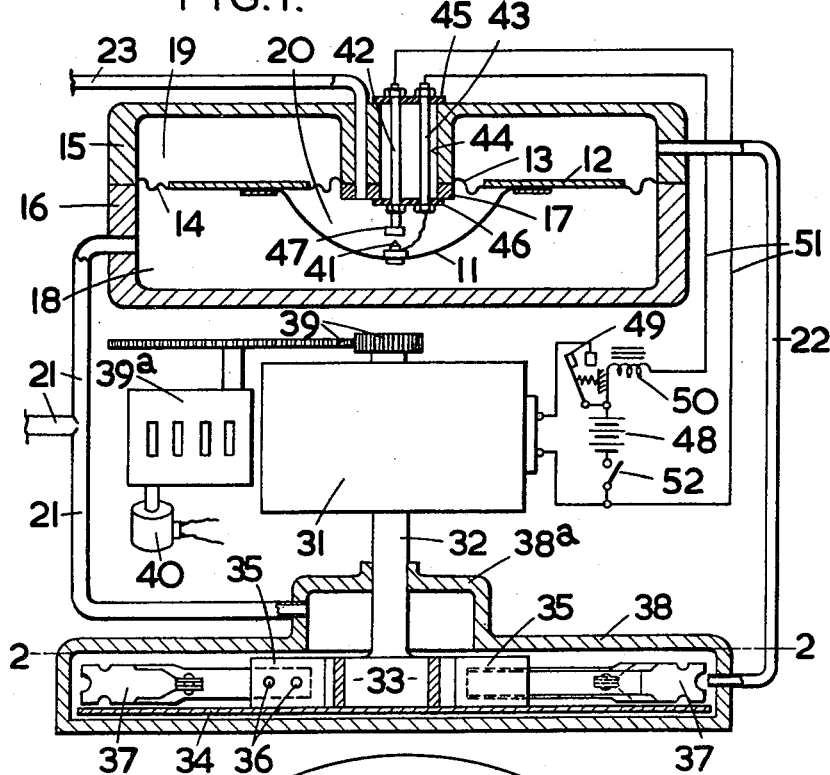
Figure 1 shows essential features of the fan and pressure responsive diaphragm assembly of an instrument according to one form of the invention the diaphragm assembly being in cross-section and the fan being in section on the line 1—1 of Figure 2.

As shown in Figure 1, a pressure responsive diaphragm assembly comprises a composite diaphragm having a domed central portion 11 concentrically secured fluid tight to an annular outer portion 12 the inner and outer margins 13 and 14 of which are flexible and clamped at their edges, the latter between upper and lower parts 15 and 16 of a casing and the former between the face of a central boss of the upper casing part 15 and an apertured plate 17.

There are thus provided three fluid tight compartments 18, 19 and 20 enclosing the whole of the diaphragm at its lower side, an annular area of the diaphragm at its upper side, and a central area of the diaphragm at its upper side, respectively.

An airduct or pipe 21 intended to be connected with a source of pitot pressure (not shown) communicates with the compartment 18, a pipe or duct 22 communicates with the annular compartment 19, and a pipe or duct 23 intended to be connected to a source of static pressure (not shown) communicates with the central compartment 20.

A motor indicated at 31 has fast on its shaft 32 a fan rotor comprising a central boss or hub 33 and a flat disc 34 formed integrally by casting with six radial rigid blades or blade roots 35 to which are secured by rivets indicated at 36, 36 blade members 37 which are described in detail hereinafter. This rotor is enclosed fluid tight in a casing 38 with a central domed or raised intake part 38a of which the pitot pressure air pipe or duct 21 communicates. The air duct or pipe 22 from the annular diaphragm compartment 19 extends through the periphery of the fan casing 38 and is bent therewithin at right angles in the directions opposite to that in which the fan rotor rotates so as to constitute an outlet scoop for the fan, the blade members 37 being cut away as shown at their outer end to clear the bent end of the pipe 22.

Thus, both the fan intake 38a and the large diaphragm compartment 18 are connected with the same pitot pressure pipe 21, the annular diaphragm compartment 19 is connected with the outlet of the fan, and the central diaphragm compartment 20 is connected with the static pressure pipe 23.

The motor 31 is connected by gearing 39 to drive an indicator device 39a of known or convenient type showing miles travelled and may also drive an electric transmitter device of known type, indicated at 40, for transmitting a drive to one or more repeater motors (not shown) to operate further distance or speed indicating units.

The domed portion 11 of the composite diaphragm has an insulated contact 41 mounted thereon and two bolts 42 and 43 extend through a bore 44 in the central boss of the upper casing part 15 and the plate 17 between insulating discs 45 and 46, the bolt 42 terminating in a contact 47 with which the diaphragm contact 41 engages when the diaphragm moves upwardly and the bolt 43 having the diaphragm contact 41 connected therewith as shown. The motor 31 is connected with a source of electricity, indicated as a battery 48 through normally open contacts 49 of a relay having a coil 50 which is connected by leads 51 across the source 48 in series with the contacts 41 and 47 of the diaphragm assembly.

The blade members 37 are such, as will be described hereinafter, that they become increasingly deflected under the action of centrifugal force to reduce progressively the effective radius of the fan as its speed increases above a predetermined value.

It will be seen that, when the pipes 21 and 23 are connected with sources of pitot pressure and static pressure, respectively, and the electric circuit is completed by closing a switch 52 in series with the source 48, pitot pressure, acting on the whole area of the composite diaphragm 11, 12 from below, will be opposed by static pressure, acting on a central area, and fan pressure (i. e. pitot pressure plus the pressure actually developed by the rotation of the fan) acting on an outer annular area of the composite diaphragm 11, 12 from above. It will also be seen that the motor 31 will be connected with the source 48 when the contacts 41 and 47 close and energise the relay coil 50 and will be disconnected when the contact 41 moves away from the contact 47 and by so de-energising the coil 50 causes the relay contacts 49 to open. In use, therefore, supposing the contacts 41, 47 to be open, the fan will decelerate until the pressure in compartment 19 plus that in compartment 20 is overcome by the pitot pressure in compartment 18 when the composite diaphragm 11, 12 will move upwardly and bring the contact 41 into engagement with contact 47. When this occurs the motor 31 will accelerate and the fan pressure in compartment 19 will increase until the pitot pressure in compartment 18 is overcome and the composite diaphragm 11, 12 is moved downwardly so opening contacts 41, 47 and causing the motor 31 once more to decelerate. This cycle is repeated continuously and the motor 31 is thereby caused to hunt about a mean speed dependent upon the speed of travel, relative to the air, of a craft in which the apparatus is installed.

It will be seen that the diaphragm assembly affords a greater mechanical advantage to pitot pressure than to fan pressure, i. e., a greater tendency for the diaphragm to move under increase of pitot pressure than under increase of fan pressure. Also, with the fan intake connected to pitot pressure (instead of to static pressure as in the known apparatus referred to) fan pressure (in compartment 19) increases more than linearly with the square of fan speed and consequently the fan would run at too low a speed for useful working were it not for the automatic decrease in the effective radius of the fan due to the movement of the blade members 37, under the influence of centrifugal force, which has the effect of increasing the speed at which the fan must rotate for the pressures in compartments 19 and 20 to balance or overcome that in compartment 18, to a value corresponding accurately to the speed of travel relative to the air.

The decreasing diameter fan illustrated is a preferred construction for use in the speed or distance indicating apparatus described. It will be apparent, however, not only that this preferred construction of fan can be used in other applications where the automatically decreasing effective radius feature is desirable, but also that other constructions possessing this feature may be employed in distance or speed indicating apparatus according to the invention.

Figure 2:
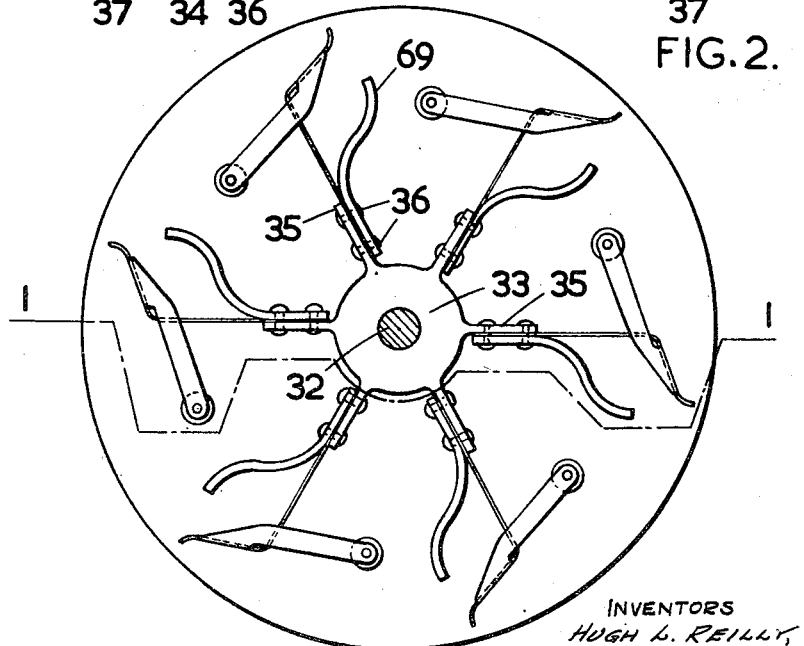
Figure 2 is a plan view of the fan rotor.
Figure 3:
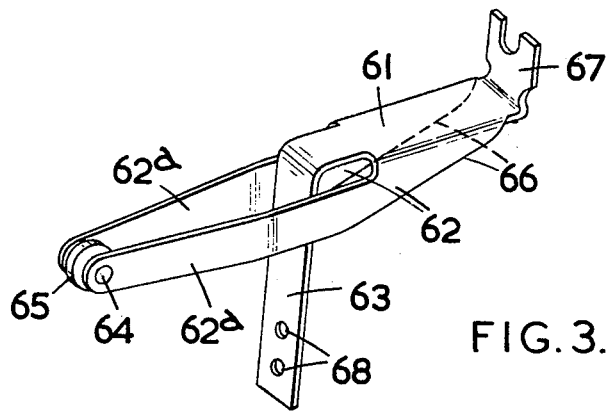
Figure 3 is a perspective view to an enlarged scale of a fan blade member.

In the preferred construction of fan according to the invention the automatic reduction of effective radius with increase in rotary speed is obtained by use of the blade members 37. Each of these, see Figure 3, is formed by pressing from sheet metal as a channel section beam member having a base 61 and side flanges 62, with part of the base 61 displaced and bent so as to project between and beyond the side flanges 62 as a resilient mounting tongue 63. Those portions 62a of the side flanges 62 from between which the tongue 63 is displaced are bent towards one another and secured together at their free ends by a rivet 64 over which are threaded between the flange portions 62a a number of washer like weights 65. At their other ends the side flanges 62 are cut away as at 66 towards the base 61 and so as to leave projecting therefrom the corresponding end portion of the base 61 which is bent in the direction opposite to the tongue 63 to constitute a blade tip 67. The mounting tongue 63 is formed with apertures 68 to take rivets or bolts for securing them to rigid blade root members extending radially from a hub such as those indicated at 35 and 33, respectively in Figure 2. In the case of the fan shown in Figure 2 the rivets 36 also secure to the blade root members 35 rigid stop members 69. The weights or washers 65 are such and so positioned lengthwise of the beam member that as the fan speed increases the action of centrifugal force thereon is resisted by the stiffness of the resilient tongue 63 until a predetermined speed is reached when the tongue 63 begins to yield and the beam rocks in a clockwise direction retracting its tip 67 towards the fan centre. In the apparatus of Figures 1 and 2 it is desirable in the interests of accuracy that the weighted end of the beam member should never extend further from the fan centre than the blade tip 67 and for this purpose the outer end of each rigid stop member 69 is positioned to limit the retraction of the blade tip 37 accordingly.

As in the earlier air distance or speed indicating apparatus referred to it is important that the temperature in the fan casing 38 should be maintained substantially the same as that of the air outside an aircraft in which the apparatus is installed and for this purpose the fan casing 38 has a jacket in communication with the outside air which also in accordance with a feature of the present invention is designed for mounting with a substantial area of its outer surface, or of the outer surface of a member in intimate contact therewith, in direct contact with the outside air and constituting, so to speak, part of the "skin" of the craft.

Figure 4:
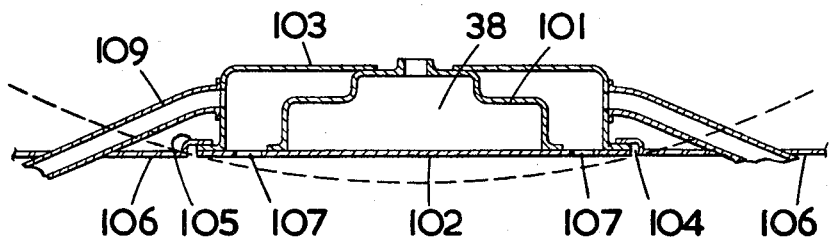
Figures 4 and 5 are fragmentary sectional views illustrating mountings for the fan casing.

As shown in Figure 4, for example, in which the fan itself is omitted, the fan casing 38 comprises a dished member 101 secured at its rim to a concentric plate 102 of greater diameter than the member 101, and a second dished member 103 has a flange 104 at its rim whereby it is secured to the rim of the plate 102 concentrically of the latter, the flange 104 being designed to fit and be secured to a bezel member 105 bounding an opening formed in the skin which is indicated at 106 of the wing or fuselage of an aircraft. The flat inner wall of the dished member 103 may serve as a mounting for the fan driving motor and also if desired for the diaphragm assembly and other components shown in Figure 1. The space or jacket between the two dished members 101 and 103 is open to the outside air by way of a series of openings 107 formed in the margin of the plate 102 around the casing 38 and also by two air ducts 108 and 109 of which the latter projects outwardly beyond the skin 106 and is located in the rear of the duct 108 so that the flow of air over the skin 106 tends to draw air through the jacket and out by the duct 109. In some cases it may be convenient for the plate 102 to be located at a place e. g., the upperside of a wing or fuselage, where moisture or rain could run or drain into openings such as 107. In such a case these openings 107 would be omitted and ducts such as 108 and 109 lengthened, if necessary, to extend downwardly through the aircraft skin, alone relied upon for the flow of outside air around the casing 38.

Figure 5:
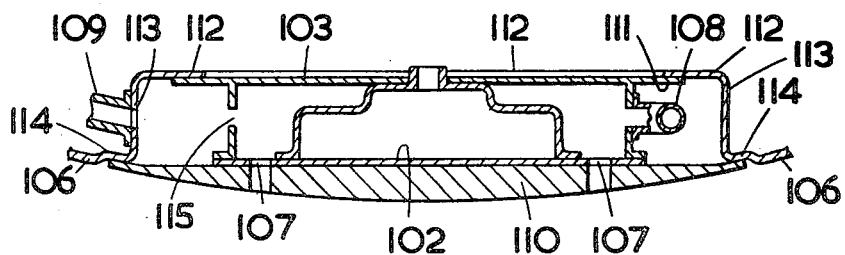

In cases where the aircraft skin is of substantial curvature the plate 102 may be made of increasing thickness from its periphery towards its centre as indicated by broken lines in Figure 4. Alternatively, the plate 102 may seat upon a circular member 110 the outer surface of which is shaped to conform to the configuration of the aircraft skin 106 as shown in Figure 5 which also shows an arrangement in which the dished member 103 has a flange 111 adapted to be secured to the lip 112 of a deep bezel member 113 bounding an opening in the aircraft skin 106 and which also presents a seat 114 for the rim of the circular member 110. It will be noted that this construction can be used without the member 110 when the local skin configuration is flat. The curved wall of the dished member 103 is formed with a plurality of openings of which one is indicated at 115 and the air ducts 108 and 109 are arranged so that cooling air from outside the aircraft passes by way of the interior of the dished member 103 and openings 115 to the outer jacket comprised by the flange 111 and bezel member 113. In some cases the air duct 109 is omitted and the arrangement is such that air enters by the duct 108 and leaves by the openings 107.

By means of an instrument according to the invention air speed indications up to speeds of the order of 550 knots may be obtained with a high degree of accuracy.

We claim:

1. An instrument of the type described comprising, a pressure responsive assembly having a composite diaphragm, means forming with the diaphragm three fluid tight compartments, the first fluid tight compartment enclosing the whole of the diaphragm on one side, the second fluid tight compartment enclosing an annular area of the diaphragm on its other side, and the third fluid tight compartment enclosing the central area of the diaphragm on said other side, a centrifugal fan of the type wherein its effective radius decreases with increase of its rotary speed, a fluid tight casing surrounding said fan, an electrical motor for driving said fan, means for supplying pitot pressure to both said first compartment and to the inlet side of said fan, means for delivering the output of said fan to said second compartment, means for supplying static pressure to said third compartment, electrical contact members on said diaphragm and assembly respectively, said contact members being operable upon displacement of said diaphragm relative to the assembly, a source of electricity, conductors leading from said source to said motor and to said contact members respectively, means for opening said motor circuit when said contact members are open and closing said motor circuit when said contact members are closed, and indicating means driven by said motor, the output of said fan being the sum of the pitot pressure and the centrifugal pressure produced by the fan, and the mechanical advantage afforded by the pressure responsive assembly being less for the fan pressure than the pitot pressure, whereby said motor is caused to hunt about a mean speed dependent upon the speed of travel, relative to the air, of a craft in which the instrument is carried.

2. An instrument of the type described comprising a pressure responsive assembly having a composite diaphragm, means forming with the diaphragm three fluid tight compartments, the first fluid tight compartment enclosing the whole of the diaphragm on one side, the second fluid tight compartment enclosing an annular area of the diaphragm on its other side, and the third fluid tight compartment enclosing the central area of the diaphragm on said other side, a centrifugal fan of the type wherein its effective radius decreases with increase of its rotary speed, a fluid tight casing surrounding said fan having an inlet and an outlet, a motor for driving said fan, means for supplying pitot pressure to both said first compartment and to the inlet of said fan, means for delivering the output of said fan to said second compartment, means for supplying static pressure to said third compartment, contact members on said diaphragm and assembly respectively, said contact members being operable upon displacement of said diaphragm relative to the assemby, means for operating said motor when said contact members are closed and for stopping said motor when said contact members are open, and indicating means driven by said motor, the output of said fan being the sum of the pitot pressure and the centrifugal pressure produced by the fan, and the mechanical advantage afforded by the pressure responsive assembly being less for the fan output pressure than the pitot pressure, whereby said motor is caused to hunt about a mean speed dependent upon the speed of travel, relative to the air, of a craft in which the instrument is carried.

3. An instrument of the type described comprising, a pressure responsive assembly having a composite diaphragm, means forming with the diaphragm three fluid tight compartments, the first fluid tight compartment enclosing the whole of the diaphragm on one side, the second fluid tight compartment enclosing an annular area of the diaphragm on its other side, and the third fluid tight compartment enclosing the central area of the diaphragm on said other side, a centrifugal fan having a plurality of rigidly mounted blades, a beam member pivotally mounted at the end of each blade and shaped to provide a fan end serving as a continuation of the corresponding blade, and spring means urging the fan end of said beam members in a maximum radius position, said beam members being of lighter weight at its fan end than at the other end whereby centrifugal force acting thereon progressively overcomes the spring and retracts the fan end of the beam member as the speed of rotation of the fan is increased; a fluid tight casing surrounding said fan having an inlet and an outlet, a motor for driving said fan, means for supplying pitot pressure to both said first compartment and to the inlet of said fan, means for delivering the output of said fan to said second compartment, means for supplying static pressure to said third compartment, contact members on said diaphragm and assembly respectively, said contact members being operable upon displacement of said diaphragm relative to the assembly, means for operating said motor when said contact members are closed and for stopping said motor when said contact members are open, and indicating means driven by said motor, the output of said fan being the sum of the pitot pressure and the centrifugal pressure produced by the fan, and the mechanical advantage afforded by the pressure responsive assembly being less for the fan output pressure than the pitot pressure, whereby said motor is caused to hunt about a mean speed dependent upon the speed of travel, relative to the air, of a craft in which the instrument is carried.

4. In an instrument of the type described comprising, a pressure responsive assembly having a composite diaphragm, means forming with the diaphragm three fluid tight compartments, the first fluid tight compartment enclosing the whole of the diaphragm on one side, the second fluid tight compartment enclosing an annular area of the diaphragm on its other side, and the third fluid tight compartment enclosing the central area of the diaphragm on said other side, the mechanical advantage afforded by said first compartment being greater than that of said second compartment, contact means on said diaphragm and said assembly respectively, said contact means being operable upon displacement of said diaphragm relative to the assembly, a booster means, means for supplying pitot pressure to said booster means and to said first chamber, means for delivering the output of said booster means to said second chamber, means for supplying static pressure to said third chamber, a motor for driving said booster, and means for operating said motor when said contact means are open and closed respectively, and a centrifugal fan in said booster means comprising a plurality of rigidly mounted blades, a beam member pivotly mounted intermediate its ends to the end of each blade, one end of said beam member being shaped to provide a fan end and serving as a continuation of the blade, spring means for urging the fan end of said beam member in a maximum radius position and its other end in a minimum radius position, said beam member being of lighter weight towards its fan end than towards the other end thereof so that centrifugal force acting thereon progressively overcomes the influence of the spring means and retracts the fan end of the beam member to a minimum radius position as the speed of rotation of the fan is increased, the output of said booster means being sum of the pitot pressure and the centrifugal pressure produced by said fan.

5. In an instrument according to claim 4, wherein each beam member has a fully retracted position in which its fan end is at least as far from the fan center as the other end of the beam member.

6. In an instrument according to claim 4, wherein the beam member is mounted to rock in a general plane to which the axis of rotation of the fan is normal.

7. In an instrument according to claim 4, wherein the spring means is a bent leaf spring attached to the end of the rigidly mounted blade, said spring joining the beam member intermediately of the length of said beam member.

8. An instrument of the type described comprising, a pressure responsive assembly having a composite diaphragm, means forming with the diaphragm three fluid tight compartments, the first fluid tight compartment enclosing the whole of the diaphragm on one side, the second fluid tight compartment enclosing an annular area of the diaphragm on its other side, and the third fluid tight compartment enclosing the central area of the diaphragm on said other side, a centrifugal fan of the type wherein its effective radius decreased with increase of its rotary speed, a fluid tight casing surrounding said fan having an inlet and an outlet, said fan casing being mounted on the aircraft so that a substantial part of the casing is in actual contact with the air outside the aircraft, a motor for driving said fan, means for supplying pitot pressure to both said first compartment and to the inlet of said fan, means for delivering the output of said fan to said second compartment, means for supplying static pressure to said third compartment, contact members on said diaphragm and assembly respectively, said contact members being operable upon displacement of said diaphragm relative to the assembly, means for operating said motor when said contact members are closed and for stopping said motor when said contact members are open, and indicating means driven by said motor, the output of said fan being the sum of the pitot pressure and the centrifugal pressure produced by the fan, and the mechanical advantage afforded by the pressure responsive assembly being less for the fan output pressure than the pitot pressure, whereby said motor is caused to hunt about a mean speed dependent upon the speed of travel, relative to the air of a craft in which the instrument is carried.

HUGH LAMBERT REILLY.
FRANK HERBERT SCRIMSHAW.
ARTHUR GEORGE BONE.

REFERENCES CITED

The following references are of record in the file of this patent:

UNITED STATES PATENTS

| Number | Name | Date |
|---|---|---|
| 1,451,064 | Dunajeff | Apr. 10, 1923 |
| 2,269,068 | Corbin | Jan. 6, 1942 |
| 2,370,600 | Wightman | Feb. 27, 1945 |
| 2,441,381 | Anderson | May 11, 1948 |
| 2,442,783 | Senn | June 8, 1948 |
| 2,454,007 | Reilly et al. | Nov. 16, 1948 |

FOREIGN PATENTS

| Number | Country | Date |
|---|---|---|
| 623,587 | Great Britain | May 19, 1949 |